United States Patent
Stahl et al.

(10) Patent No.: US 7,318,099 B2
(45) Date of Patent: Jan. 8, 2008

(54) METHOD AND APPARATUS FOR CONTROLLING THE DISTRIBUTION OF DIGITALLY ENCODED DATA IN A NETWORK

(75) Inventors: Thomas Anthony Stahl, Indianapolis, IN (US); David Jay Duffield, Indianapolis, IN (US); Eric Stephen Carlsgaard, Zionsville, IN (US)

(73) Assignee: Thomas Licensing, Boulogne (FR)

( * ) Notice: Subject to any disclaimer, the term of this patent is extended or adjusted under 35 U.S.C. 154(b) by 334 days.

(21) Appl. No.: 10/517,089

(22) PCT Filed: Jun. 5, 2003

(86) PCT No.: PCT/US03/17663

§ 371 (c)(1), (2), (4) Date: Dec. 6, 2004

(87) PCT Pub. No.: WO03/104922

PCT Pub. Date: Dec. 18, 2003

(65) Prior Publication Data
US 2005/0198282 A1    Sep. 8, 2005

Related U.S. Application Data

(60) Provisional application No. 60/387,054, filed on Jun. 7, 2002.

(51) Int. Cl.
G06F 15/16     (2006.01)

(52) U.S. Cl. .................. 709/229; 709/238

(58) Field of Classification Search ............. 709/229, 709/231, 238, 245, 225; 726/3, 26–27; 713/155
See application file for complete search history.

(56) References Cited

U.S. PATENT DOCUMENTS 5,936,968 A    8/1999   Lyons (Continued)

FOREIGN PATENT DOCUMENTS

| WO | WO 01/63387 | 8/2001 |
| WO | WO 02/44892 | 6/2002 |

OTHER PUBLICATIONS

Search report dated Apr. 18, 2004.

(Continued)

*Primary Examiner*—Abdullahi Salad
(74) *Attorney, Agent, or Firm*—Joseph J. Laks; Robert D. Shedd; Paul P. Kiel (57) ABSTRACT

An apparatus and a method for controlling distribution of digital content from an device attached to a network to another device outside the network. The device receives a digital signal containing content, the digital signal having an authorization field indicative of a first transport mode authorizing the content for distribution outside the network, and of a second transport mode wherein the content is not authorized for transmission outside the network. The method comprises the steps of receiving location information of a router on the network for routing content to devices outside the network, receiving destination data indicative of location information associated with a destination device to which the device intends to distribute the content, determining whether the destination device is outside the network based on the router location information and the received destination data examining the authorization field and, inhibiting transmission of the content if the destination device is outside the network and the digital signal is in the inhibit mode.

18 Claims, 4 Drawing Sheets

U.S. PATENT DOCUMENTS

| | | |
|---|---|---|
| 5,996,021 A | 11/1999 | Civanlar et al. |
| 6,141,693 A | 10/2000 | Perlman et al. |
| 6,144,242 A | 11/2000 | Jeong et al. |
| 6,167,444 A | 12/2000 | Boden et al. |
| 6,295,296 B1 * | 9/2001 | Tappan ..................... 370/392 |
| 6,345,294 B1 | 2/2002 | O'Toole et al. |
| 6,415,323 B1 | 7/2002 | McCanne et al. |
| 6,480,537 B1 | 11/2002 | Agrawal et al. |
| 6,496,862 B1 | 12/2002 | Akatsu et al. |
| 6,525,775 B1 | 2/2003 | Kahn et al. |
| 6,529,526 B1 | 3/2003 | Schneidewend |
| 6,693,878 B1 * | 2/2004 | Daruwalla et al. .......... 370/235 |
| 6,711,172 B1 * | 3/2004 | Li ............................. 370/401 |
| 6,892,306 B1 * | 5/2005 | En-Seung et al. .......... 713/193 |
| 2002/0106081 A1 * | 8/2002 | Yang .......................... 380/201 |
| 2003/0074452 A1 * | 4/2003 | Zheng et al. ............... 709/228 |
| 2004/0184450 A1 * | 9/2004 | Omran ....................... 370/372 |
| 2004/0225891 A1 * | 11/2004 | Kang et al. ................. 713/193 |
| 2004/0252688 A1 * | 12/2004 | May et al. .................. 370/389 |
| 2006/0168258 A1 * | 7/2006 | Spicer et al. ............... 709/229 |

OTHER PUBLICATIONS

"Call for Proposals for Content Protection & Copy Management Technologies", Jul. 5, 2001, Retrieved from the Internet URL:HTTP://www.cptwg.org/Assets/DVB-CPT-CIP_rev1.2PDF.

* cited by examiner

METHOD AND APPARATUS FOR CONTROLLING THE DISTRIBUTION OF DIGITALLY ENCODED DATA IN A NETWORK

RELATED APPLICATIONS

This application claims the benefit, under 35 U.S.C. § 365 of International Application PCT/US03/17663, filed Jun. 5, 2003, which was published in accordance with PCT Article 21(2) on Dec. 18, 2003 in English and which claims the benefit of U.S. provisional patent application No. 60/387,054, filed Jun. 7, 2002.

FIELD OF THE INVENTION

The present invention relates to communication systems generally and, more particularly, to a system and method for protecting unauthorized distribution of content to a remote network location.

BACKGROUND OF THE INVENTION

Content creators and providers, such as movie studios, production companies and service providers (ISPs), have a need for protecting their investment, for example, movies, programming, services, software, and the like. Such content has typically found its way to the consumer through terrestrial broadcasts, premium programming, cable or satellite channels, pay-per-view events, and retail sales and rentals of videocassettes.

In terrestrial broadcasts, program content is transmitted in digital format to an access device such as a digital receiver. The nature of digital storage and transmission allows endless generations of copies to be produced with the same quality as the original master. Furthermore, unless the signal is encrypted, the received content may be easily copied and/or forwarded to additional products or devices not intended or authorized to receive such content. Moreover, products with digital outputs allow for the convenience of networked systems and higher quality recording and re-transmission of data. A home network, which receives content for display and storage, must now also protect content against illegal copying or distribution.

It has been proposed that a broadcast flag (BF) be carried in a digital signal such as a video broadcast stream, for the purpose of identifying that the digitally encoded data (such as video content) shall not be transmitted outside of the receiving device's own network. As used herein, the term content includes the digital signal, or the digitally encoded data, that is used to carry the program content. The flag may be carried in the PMT/EIT field of an MPEG-2 transport stream, for example, as a field comprising one or more bits. Currently, however, no mechanism exists for implementing how a network such as a home network should honor the flag so that content is not transmitted outside of the network.

One possible solution is to add additional flags into other portions of the digital signal, such as an Ethernet header, to signify to a router, cable modem and the like, that the content should not be forwarded to the outside world. Another proposal would require the use of only protected (encrypted data) interfaces such as IEEE 1394 with SC or DVI with HDCP. However, such implementations have the disadvantage of requiring costly changes to the infrastructure of existing (as well as future) home networks. Such infrastructure changes would significantly impede the trend of customers using their home network to distribute content to other electronic devices within their own home, thereby stifling a very promising market for home user electronic devices and content distribution within a home network.

SUMMARY OF THE INVENTION

The present invention provides a method for controlling distribution of digitally encoded content from an access device attached to a network to another device outside the network, the access device receiving a digital signal representative of program content, the digital signal having an authorization field indicative of a first transport mode authorizing the distribution of the content outside the network, and of a second transport mode inhibiting the distribution of the content outside the network. The method comprises the steps of receiving location information of a router on the network that is used for routing content to devices outside the network; receiving destination data indicative of location information associated with a destination device to which the access device intends to distribute the content; determining whether the destination device is outside the network based on the router location information and the received destination data; examining the authorization field and, controlling the distribution of the content in response to the determination of whether the device is outside the network and whether the transport mode authorizes or inhibits the distribution of the content outside the network.

In another aspect, the present invention also provides a device coupled to a network for distributing content to at least another device, the access device receiving a digital signal representative of program content, the digital signal including an authorization field indicative of a first transport mode wherein authorizing distribution of the digital signal is authorized outside the network, and a second transport mode inhibiting distribution of the digital signal outside the network. The device comprises memory having stored therein computer code for executing a send operation for transmitting data on the network; a processor for controlling data receiving and transmitting operations of the device, the processor including data storage means for storing address information of devices connected to the network; and data interface means, coupled to the network, for receiving data from devices attached to the network, and for distributing the digital signals on the network, wherein the processor inhibits transmission of the digital signal on the network in response to a determination that the device is outside the network and that the authorization field is indicative of the second transport mode, otherwise, the processor enables transmission of the digital signal on the network.

DETAILED DESCRIPTION

Figure 1:
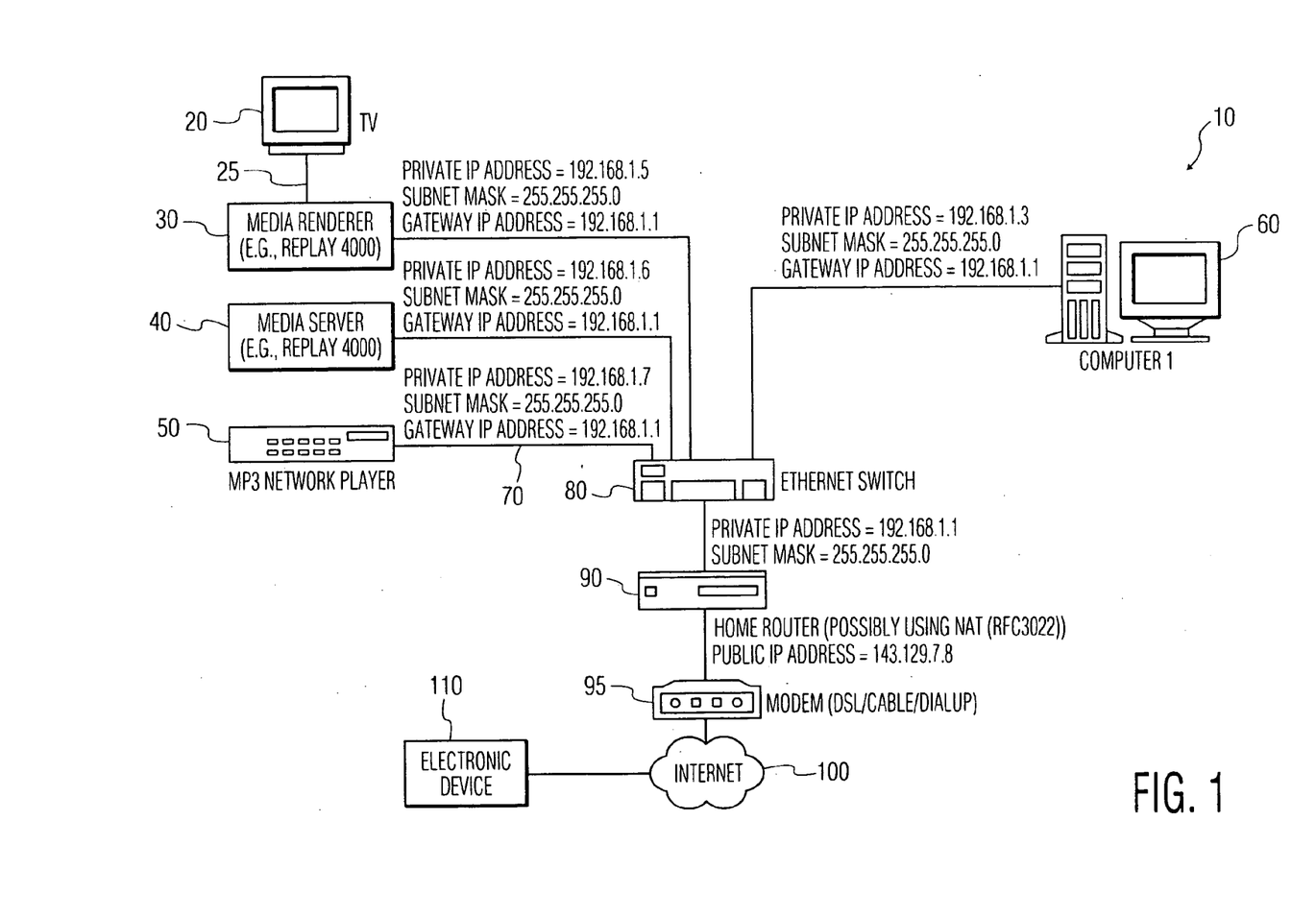
FIG. 1 is a block diagram of a home network system embodying an aspect of the present invention.

Referring now to FIG. 1, there is shown a home network system 10 comprising a plurality of access devices 20, 30, 40, 50, 60 coupled via a home network such as Ethernet network 70 through switch 80 to router/gateway device 90. Home router 90 bridges multiple external service providers (e.g. internet 100) and remote devices (e.g. electronic device 110 or optional modem 95) outside the home network to enable communications with home network 70. For example, router 90 is capable of receiving and forwarding media feeds from terrestrial broadcast sources, satellite broadcasts, cable and the like, via a corresponding interface (e.g. terrestrial broadcast I/F, satellite I/F, asynchronous digital subscriber line I/F, etc.). It is understood that the router 90 is capable of IP routing and transport stream routing of data packets via an appropriate protocol, such as MPEG-2 for example, to various consumer electronic devices both inside and outside the home network.

In the exemplary embodiment depicted in FIG. 1, router 90 is a conventional router device having a mapping table for mapping device IP addresses to physical addresses for routing data into and/or outside of the home network. The access devices 20-60 located within the home network may be any one of a number of consumer electronic devices, including but not limited to servers, digital televisions and monitors, MP3 and DVD devices, printers and print serves, Personal computers (PCs) and the like. In the exemplary configuration of FIG. 1, device 20 is a Television device such as an HDTV coupled via bus 25 to media renderer device 30 (e.g. Replay 4000). The exemplary home network system 10 shown in FIG. 1 further includes media server 40, MP3 network player 50 and personal computer (PC) 60. Each of these devices has an associated IP address, physical address and subnet mask, as is understood in the art.

Router 90 is operable to receive a digital signal such as an MPEG-2 open terrestrial broadcast signal and forward the signal to the appropriate receiving device on the home network. Note that other such terrestrial broadcast signals may also be received and processed for transfer to the home network 10, such as MPEG-1, MPEG-4, JPEG, and the like.

The receiving/access devices within the home network are configured with appropriate hardware and/or software functionality to receive and decode packetized data such as MPEG-2 transport streams containing audio/video/data content. Compression algorithms at the source of the broadcast operate to reduce the required bandwidth for the transmission medium and yet maintain reasonable video quality at the receiver.

Figure 2:
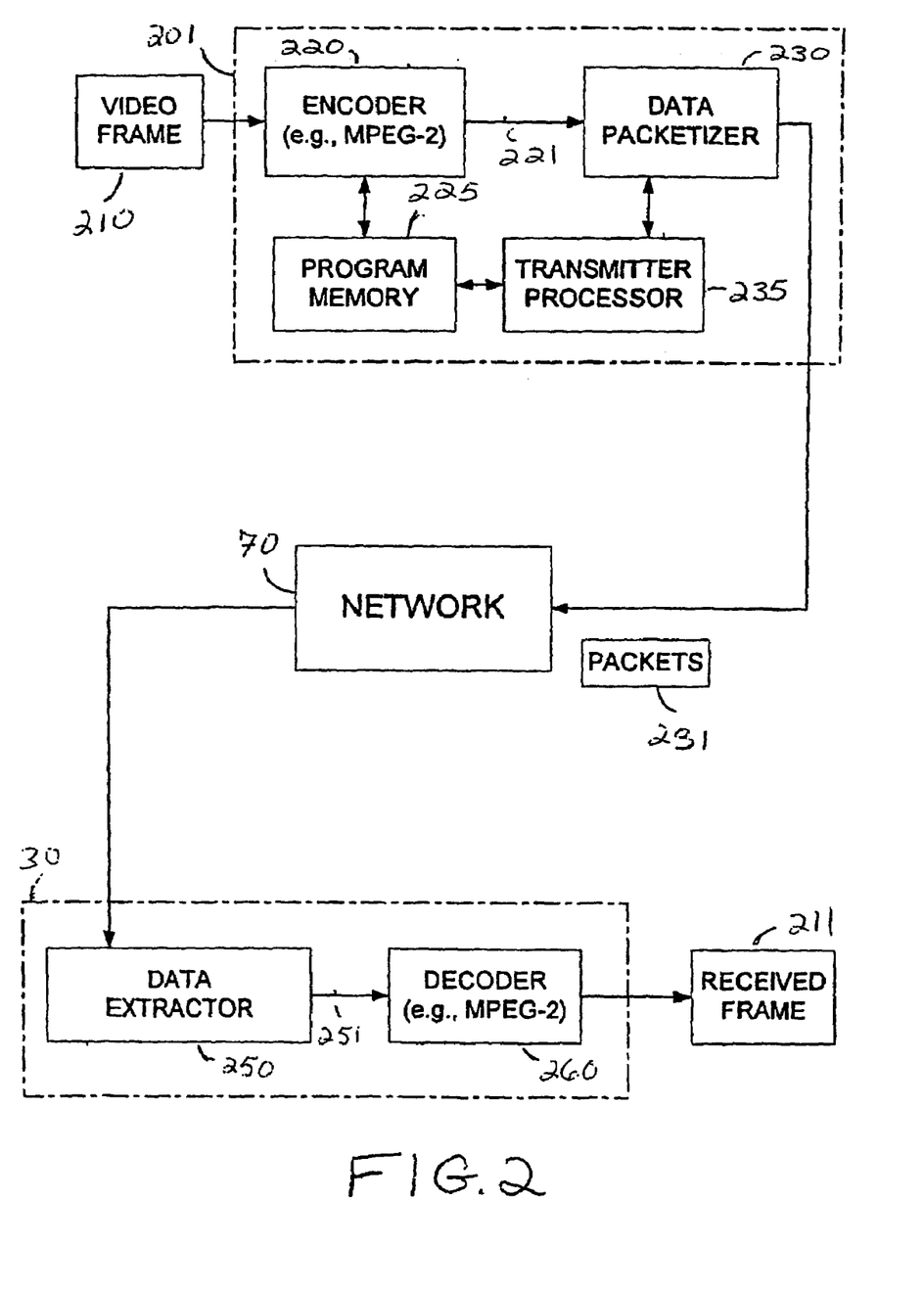
FIG. 2 is an exemplary block diagram illustrating major functional components associated with the propagation and reception of packets representative of video frame transport stream information.

FIG. 2 is an exemplary illustration of an arrangement whereby video frame content is transmitted via packets through Ethernet packet network 70 illustrated in FIG. 1. Each video frame produced by a standard source (not shown), as exemplified by frame 210 serving as the input to a transmitter 201, is compressed by encoder 220 with reference to an encoding program stored in program memory 225, and the encoded output 221 is formatted into packets 231 by data packetizer 230. Transmitter processor 235 controls the interactions of encoder 220 with program memory 225, and also provides the necessary control information so as to form packets 231. Packets 231 are transmitted via packet network 70 and detected by an access device (e.g. 30) where the packets are processed by data extractor 250 of the access device to produce the received counterpart 251 of compressed output 221 in transmitter 201. The resulting data stream 251 is decompressed and decoded by decoder 260 to produce received frame 211 corresponding to the content provided in frame 210.

In the exemplary embodiment depicted herein, data packetizer 230 generally includes elements corresponding to the MPEG-2 standard, for generating: (a) an elementary stream (ES) of encoded video; (b) a packetized elementary stream (PES) from the elementary stream; and (c) a transport stream from one or more PESs to derive the MPEG-2 packets 231 ready for transport over network 70. The encoded video is processed by adding information that is used to reconstruct the frames at the receiving end. Such information includes, for example, timing information (e.g., the Presentation Time Stamp (PTS) and the Decode Time Stamp (DTS)), clock reference information (e.g. PCR) and PMT/EIT data. Thus, in a generic sense, data packetizer 230 transforms the encoded video to the transport stream which contains all necessary information to re-transform the transport stream to derive the content.

In the home network system illustrated in FIG. 1, one or more of the access devices (20, 30, 40, 50, 60) is operable for both receiving content transmitted via an MPEG-2 transport stream and also operable for transmitting or re-distributing the content to another device which resides either within home network 70 or external to the network. Such transmission is accomplished using a "protocol stack" comprising "applications/service" level layer application for producing the encoded MPEG-2 audio/video/data stream packet; "transport" level layer applications for encapsulating each packet in the MPEG-2 stream by appending headers (e.g. RTP, UDP headers); "Network" level layer applications for further encapsulating the prior layer by appending the IP header information, including for example, routing or re-routing information. "Data Link" level layer applications accomplishes error control and access control and further encapsulates the resulting packets by appending an Ethernet header for instance. "Physical" level layer applications engender the actual transmission at the bit-level.

In one configuration, the access device 30, in addition to the receiving function shown therein, would also include each of the functional elements illustrated in the transmitter portion 201 of FIG. 2 for transmitting and/or re-distributing content received in the transport stream to another device.

In accordance with an aspect of the present invention, when an access device within a home network receives a terrestrial broadcast signal as described above, the device may be functionally capable of distributing the content contained in the broadcast signal to another device, either within the network or outside the network via a home router. Nevertheless, it may be desired to place certain restraints on the re-distribution of such content to other devices outside of the home network, based on the nature of the content, for example.

According to an aspect of the present invention, functionality provided within the access device itself at the software application level operates to determine whether the content is to be distributed outside the network (based on a flag contained in a portion of the transport stream packets), without requiring modification to the infrastructure of the home network environment.

In present home network configurations a home router may be configured to perform Network Address Translation (NAT) as described in RFC 3022, for example. The router receives a packet and examines the packet's destination IP address. Based on the subnet mask and its own local IP address, the router determines whether the packet is intended for the home network or whether it is intended for a destination device outside of the home network. If the packet is intended for a destination outside of the home network, the router forwards the packet to an external address after substituting its own public IP address into the packet's source IP address field. When the destination device responds, it responds back to the public IP address of the router. The router receives the response and maps it to the request, thereby determining which device inside the home network made the original request. The router places the destination device's local IP address into the destination field and forwards it on to the originating device.

Figure 3:
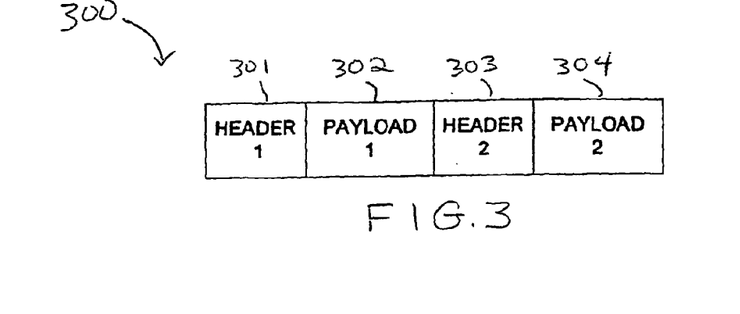
FIG. 3 is a block diagram of a transport stream.
Figure 4A:
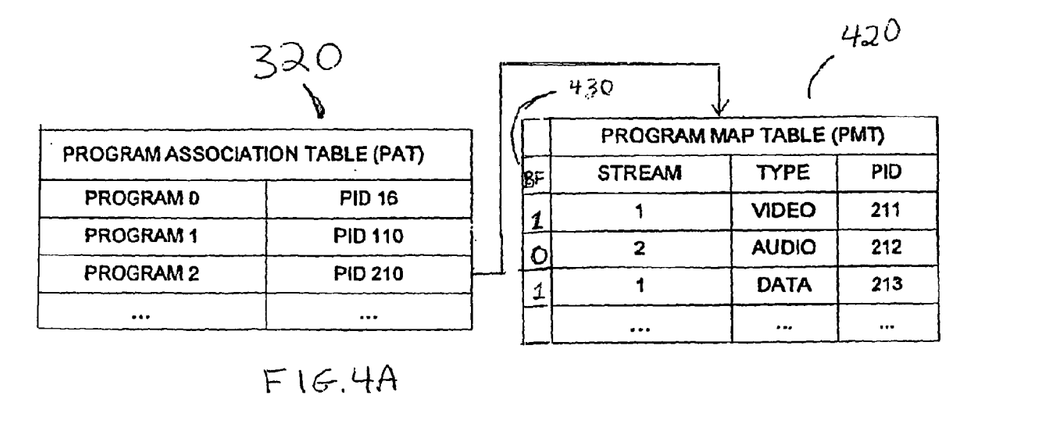
FIG. 4A is an exemplary illustration of PAT and PMT linkage containing a broadcast flag authorization field within a transport stream.

In accordance with the configuration shown in FIG. 1, each device on an Ethernet network has a physical address and an IP address. As shown in FIG. 3, in an exemplary embodiment, terrestrial broadcast signal 300 comprising an MPEG-2 transport stream intended for access device 30 (FIG. 1) within home network 70 includes a header/payload pair, namely, header 301 and its accompanying payload 302, header 303 and its accompanying payload 304, and so forth. Header 301 is generally four-bytes long, and payload 302 is 184-bytes. Transport stream 300 is emitted by data packetizer 230 of FIG. 2. Each header contains various header information including PD (Packet Identifier) field data. In addition, the payload is composed of components of the compressed video (or in other applications, audio, data, and teletext/closed captioning), as well as referencing information. Payload 302 includes Program Association Table (PAT) information, which associates a PID with a given program or collection of streams within a common timebase, and Program Map table (PMT) information, which provides more detailed referencing information to further define the mapping between the encoded video stream and the actual packets prepared for transmission, and is used at the receiving end to properly decode the Transport Stream. FIG. 4A illustrates an exemplary configuration linking a given PID 110 to the corresponding PAT 320 and PMT 420.

PMT 420 lists, as identified by row, the Stream Identifier, the Type of signal (e.g., video, audio, data), a PID assigned to that type by the source, and an authorization field 430 such as a broadcast flag (BF) or redistribution control descriptor carried in the video broadcast stream for the purpose of signifying information to downstream applications relating to authorization for the redistribution of content in the stream. In one embodiment, the broadcast flag (BF) is a single bit within the PMT field of the MPEG-2 transport stream, as shown in FIG. 4A. However, additional numbers of bits may be used, for example, to communicate additional information for processing by the access device.

According to a predefined convention, a BF bit value "0" indicates that the content within the transport stream packet is authorized for re-distribution to devices outside the home network (i.e. "transport mode"). Conversely, a BF bit value "1" indicates that the content within the transport stream packet is not authorized for re-distribution outside the home network (i.e. "inhibit mode").

Figure 4B:
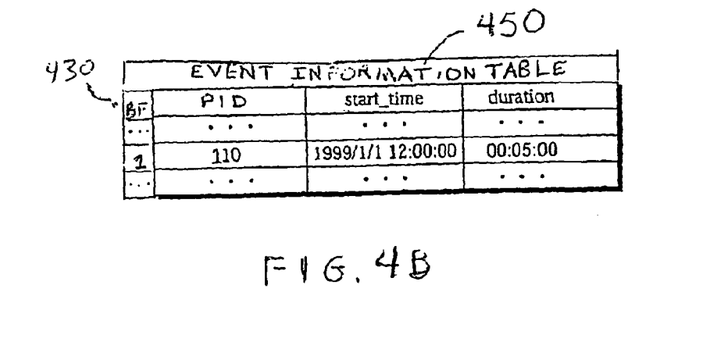
FIG. 4B is an exemplary illustration of an EIT containing a broadcast flag authorization field within a transport stream.

Alternatively, another field within the broadcast stream, such as the Event Information Table (EIT) 450 shown in FIG. 4B, may include the broadcast flag (BF) for determining authorization. FIG. 4B illustrates an exemplary EIT showing a broadcast start time and a broadcast duration of the object program (PID), along with the BF flag indicating authorization for re-distribution. The EIT may be multiplexed in the transport stream for reception and decoding by the access device. One exemplary implementation may include the BF flag in both the EIT and PMT for terrestrial broadcasts, while, for example, for cable transport, the BF flag shall be present in the PMT, and, when the EIT is carried, in the EIT, according to a given protocol (e.g. ATSC standard). The BF may appear periodically within the transport stream.

According to an aspect of the present invention, when an access device receives the broadcast signal and decodes the transport stream, the device parses the PMT/EIT field and determines the status of the BF flag 430 indicative of whether the content is authorized for re-distribution outside the home network. A software application module or hardware circuitry may be configured to examine the received payload data to recover the BF flag based on its corresponding table entry and location within the transport stream.

Figure 5:
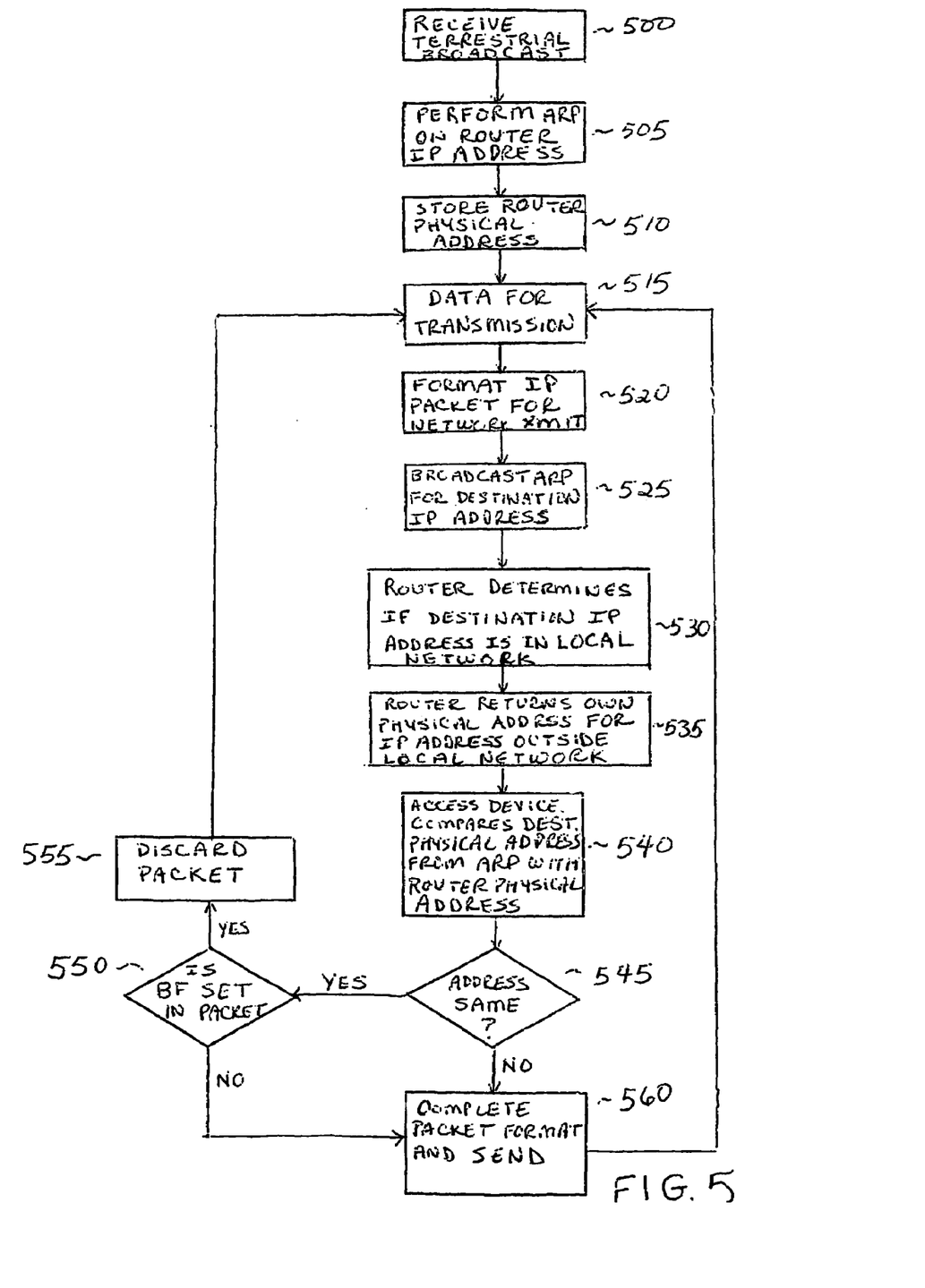
FIG. 5 is a flow chart illustrating an exemplary method of operation according to an embodiment of the present invention.

In conjunction with the home network system of FIG. 1, there is shown in FIG. 5 a method for carrying out the present invention of inhibiting unauthorized re-distribution of content according to an exemplary embodiment. When access device 30 (FIG. 1) is connected to home Ethernet network 70 and operable to both receive incoming audio/video/data broadcast streams (step 500) and to retransmit or redistribute the content contained therein, the access device, prior to redistributing the received content, performs the following acts.

The access device obtains location information associated with gateway/router 90 by performing an ARP (address resolution protocol) on the router IP address to obtain the physical address of the router (step 505). The physical address is then stored in memory (step 510). The content intended to be transmitted to a destination device in the form of a packet is then formatted (steps 515, 520) in accordance with predefined format and convention. The access device broadcasts a request for location information for the destination device (step 525) to which the content from the access device is intended to be transmitted to. This may be accomplished by broadcasting an ARP for the destination IP address to obtain the physical address of the destination device. If the destination device is on the home network, the destination device will respond to the access devices request by providing its physical address to the access device.

When router 90 receives the broadcast ARP message, the router determines if the destination IP address is in the local subnet by comparing the portion of the address masked by the subnet mask with the portion of its own address masked by the same subnet mask (step 530). If the router determines that the destination device is outside the local network, the router returns its own physical address for the requested remote destination IP address (step 535).

The access device 30 receives the response to its request for location information for the destination device (step 540) and compares the physical address returned in response to the ARP (step 525) with the physical address of the router 90 that was previously stored in memory (step 505). If the physical address returned is the same as the gateway address stored in memory (step 545) then the packet to be transmitted is destined for a device outside of the local home network. In this case, the access device then parses the PMT payload field to recover the broadcast flag and determine whether the flag is set (step 550). If the flag is set (indicative of content not authorized for external network distribution) the access device discards the packet (step 555) and awaits the next data packet to format and process (step 515)

In the case where the broadcast flag in the transport stream packet is not set (step 550), the access device finishes formatting the packet and transmits the packet to the router 90 for routing the content to the destination device outside the home network (step 560). The access device also completes packet formation and transmission to the destination device directly upon determination that a physical address returned in response to the ARP broadcast is different than the physical address associated with router 90 (steps 540, 545), indicating that the destination device is within the home network and thus authorized for redistribution within a local environment.

The present invention is embodied in machine executable software instructions within the access device, and the present invention is carried out in a processing system by a processor executing the instructions. In other embodiments, hardwired circuitry may be used in place of or in combination with software instructions to implement the present invention. The computer instructions embodying the present invention may be loaded into memory from a persistent store such as a mass storage device and/or from one or more other computer systems over a network. For example, execution in some embodiments that downloaded instructions may be directly supported by the microprocessor and directly executed by the processor. Alternatively, the instructions may be executed by causing the microprocessor to execute an interpreter that interprets the instructions by causing the microprocessor to execute instructions, which convert the instructions into a format that can be directly executed by the microprocessor. Thus, the present invention is not limited to any specific combination of hardware circuitry and software, nor to any particular source for the instructions executed by the access device.

As described in the above exemplary embodiments, the present invention exploits the difference between an IP address on the local network and an IP address outside the local network wherein the distinction between the address spaces may be determined by subnet masks and gateway addresses. The present invention implements a mechanism for inhibiting the unauthorized redistribution of content by parsing packet information within the transport stream and determining whether the broadcast flag is set, whereby the application shall not forward the content to an IP address that is outside of its local subnetwork as defined by the subnet mask and gateway addresses.

Although the invention has been described in terms of exemplary embodiments it is not limited thereto. For example, as an added level of security, the home network may use non-routable IP addresses (i.e. private addresses). That is, certain IP addresses are reserved according to predetermined standards and conventions such as the IETF standard. The mapping table associated with Internet routers (i.e. those devices within internet 100 of FIG. 1) would thus not include these non-routable addresses. Accordingly, in the event that unauthorized content is inadvertently distributed outside of the home network, those routers receiving this information would be unable to forward it to its intended destination (as this is a non-routable address) and therefore drop the packetized data. If additional protection is desired, authentication mechanisms and encryption protocols may be utilized to provide further security and guard against unauthorized access and redistribution of certain protected content. The access device that intends to forward the content over the home network would then be required to ensure that the application that it would like to forward the content to is a trusted and compliant application. Alternatively, the access device can be configured to package the content into an IP stream using a different packing format according to a predefined convention that would be recognizable only to compliant devices.

Although the invention has been described in terms of exemplary embodiments, it is not limited thereto. For example, although the present embodiment is described with reference to an access device that is able to receive digital signals from a broadcast source such as, but not limited to, terrestrial broadcast source, a cable system, it is clear that the above described method of controlling the distribution of digital signals can be used with any device attached to a network, such as a home network. The appended claims should be construed broadly to include other variants and embodiments of the invention, which may be made by those skilled in the art without departing from the scope and range of equivalents of the invention.

What is claimed is:

1. In an access device attached to a network, a method for controlling distribution of data from the device to another device via the network, the method comprising the steps of:
   receiving a digital signal representative of program content, the digital signal having an authorization field indicative of a first transport mode authorizing distribution of the digital signal outside the network, and of a second transport mode inhibiting distribution of the digital signal outside the network;
   determining whether a destination device to which the digital signal is to be distributed is outside the network;
   determining whether the authorization field is indicative of the first or second transport mode by parsing the authorization field at the access device; and
   inhibiting transmission of the digital signal from the access device to the destination device in response to determining that the authorization field is indicative of the second transport mode and the destination device is outside the network, otherwise, transmitting the digital signal to the destination device.

2. The method of claim 1, wherein the first determining step comprises the steps of:
   receiving location information of a router on the network that is used for routing data to devices outside the network;
   receiving destination data indicative of location information associated with a destination device to which the program content is to be distributed; and
   determining whether the destination device is outside the network by determining whether the destination data corresponds to the location information of the router.

3. The method of claim 2, wherein the digital signal comprises transport stream packets.

4. The method of claim 3, wherein for each transport stream packet, a payload portion is examined to determine whether the authorization field associated with that packet indicates whether the content is authorized for transmission outside the network when the destination device is outside the network, and wherein the inhibiting step comprises discarding the packet in response to the determination.

5. The method of claim 4, wherein the step of receiving location information of the router comprises receiving a physical address of the router and storing the address in memory.

6. The method of claim 5, wherein the step of receiving destination data comprises receiving a physical address of a device on the network in response to a broadcast ARP request from the device.

7. The method of claim 6, wherein the first determining step comprises comparing the received physical address of the device on the network with the physical address of the router.

8. The method of claim 1, wherein method further comprises the step of accessing the digital signal from a broadcast source.

9. The method of claim 1, wherein the digital signal comprises an MPEG-2 transport stream.

10. The method of claim 9, wherein the authorization field is included in the PMT.

11. An access device coupled to a network and adapted to distribute data to other devices connected to the network, the device comprising:
- means for receiving a digital signal representing program content, to digital signal including an authorization field indicative of a first transport mode wherein distribution of the digital signal outside of the network is authorized, and of a second transport mode wherein distribution of the digital signal outside of the network is inhibited;
- memory encoded with computer code for executing a send operation for transmitting data on the network;
- a processor for controlling data receiving and transmitting operations of the access device, the processor including data storage means for storing address information of devices connected to the network; and
- data interface means, coupled to the network, for receiving data from devices attached to the network, and for distributing the digital signals on the network, wherein the processor is configured to parse the authorization field at the access device and the processor inhibits transmission of the digital signal on the network from the access device to the destination device in response to a determination that a destination device is outside the network and that the authorization field is indicative of the second transport mode, otherwise, the processor enables transmission of the digital signal on the network.

12. The device according to claim 11, wherein the data interface means is adapted to receive address information associated with a router attached to the network that is used to routing data to devices outside the network and to receive address information associated with the destination device, and the processor determines whether the destination device is outside the network by comparing the address information of the router and the addressing information of the destination device.

13. The device of claim 11, wherein the computer code comprises:
- computer program code for formatting an IP packet containing content to be distributed to the destination device;
- computer program code for comparing a physical address of the destination device with a physical address associated with the router on the network to determine whether the destination device is outside the network; and
- computer program code for inhibiting transmission of packet data in response to a determination that the authorization field is in the second transport mode and the destination device is outside the network.

14. The device of claim 11, wherein the digital signal comprises an MPEG-2 open data stream.

15. The device of claim 14, wherein the authorization field is included in the PMT.

16. The device of claim 11, wherein the receiving means comprises means for receiving the digital signal from a broadcast source.

17. The device of claim 16, further comprising means for authenticating the destination device using an authentication protocol.

18. The device of claim 17, wherein interface means discards the data packets in response to the determination of the second transport mode and the destination device being outside the network.

* * * * *